United States Patent [19]

Hoagland et al.

[11] Patent Number: 4,825,936
[45] Date of Patent: May 2, 1989

[54] ROTARY HEAT REGENERATOR

[75] Inventors: Lawrence C. Hoagland, Concord; Donald F. Steele, Cohasset, both of Mass.

[73] Assignee: Airxchange, Inc., Rockland, Mass.

[21] Appl. No.: 833,878

[22] Filed: Feb. 25, 1986

Related U.S. Application Data

[63] Continuation of Ser. No. 523,139, Aug. 15, 1983, abandoned.

[51] Int. Cl.⁴ ............................................. F28D 19/00
[52] U.S. Cl. ......................................... 165/8; 165/10; 165/9; 165/7; 29/157.3 R
[58] Field of Search ..................... 165/8, 10, 9, 7; 29/157.3 R

[56] References Cited

U.S. PATENT DOCUMENTS

| | | | |
|---|---|---|---|
| 2,792,071 | 5/1957 | Pennington | 165/7 |
| 3,702,156 | 11/1972 | Rohrs et al. | 165/10 |
| 4,093,435 | 6/1978 | Marron et al. | 165/8 |
| 4,432,409 | 2/1984 | Steele | 165/8 |

Primary Examiner—Albert W. Davis, Jr.
Attorney, Agent, or Firm—Schiller, Pandiscio & Kusmer

[57] ABSTRACT

A rotary heat regenerator assembly comprising an enclosure, a regenerator matrix disposed in the enclosure and releasably mounted on a matrix support secured to a rotatable shaft, a first air passage and associated blower for forcing air through a portion of the regenerator wheel, and a second air passage and associated blower for forcing air to flow through another portion of the regenerator wheel. The matrix and matrix support are designed so that rotational drive is transmitted from the rotatable shaft to the matrix via the matrix support and so that the matrix can be easily and quickly inserted on and removed from the matrix support. A blower driving motor and the blowers are mounted on a common shaft. Speed reducing driving means connects the common shaft to the rotatable shaft carrying the matrix.

12 Claims, 6 Drawing Sheets

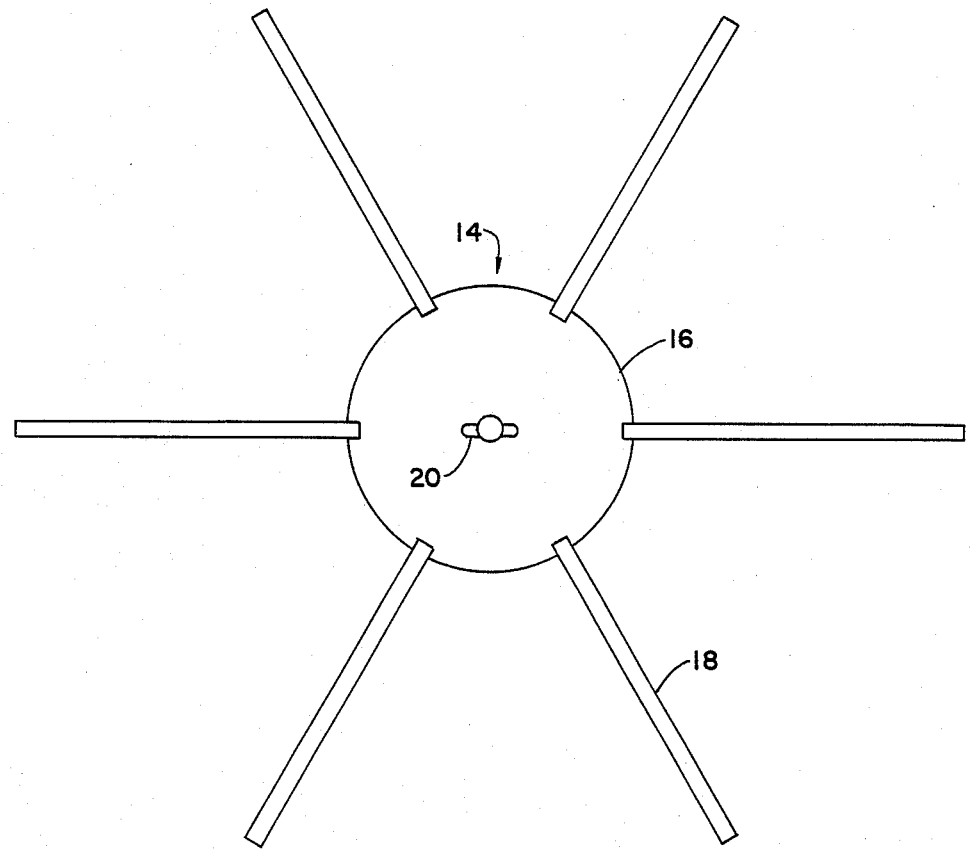

ROTARY HEAT REGENERATOR

PRIOR APPLICATION

This is a continuation of U.S. patent application Ser. No. 523,139, filed Aug. 15, 1983 now abandoned.

BACKGROUND OF THE INVENTION

In the manufacture of rotary heat regenerators for residential use, it has been found possible to form the regenerator wheel from a spiral wound strip of plastic for reasons of economy, and it has been found unexpectedly that such a wheel will have a heat exchange efficiency greater than that of a wheel made of an expensive metal such as stainless steel.

However, in the manufacture of such a matrix utilizing a plastic strip, the strip cannot be wound too tightly since excessive tension during winding will reduce the size of the air passages and reduce the efficiency of the matrix. For this reason such a matrix has little strength, particularly in a direction transverse to the plane of the matrix.

In residential use, the gas passages of the matrix may tend to clog with dust, grease, lint, animal hair, or the like, and therefore it is desirable that the wheel should be easily removed for either cleaning or replacement, and that the portion of the structure that must be removed or replaced comprise as little of the wheel structure as possible, for reasons of economy.

Since two separate blowers are required to form the two separate air streams, and means must be provided for rotating of the matrix wheel, the manufacture of such regenerators has been unduly expensive, limiting their use in residential applications

SUMMARY OF THE INVENTION

This invention provides a rotary heat regenerator which includes a regenerator wheel in which the regenerator matrix is easily removed for replacement or cleaning, and in which only the actual matrix structure is discarded when replacement is required, without the necessity of removing the matrix drive or support mechanism.

In one embodiment of the invention, the matrix includes a spiral of plastic material wound on a hub formed of a ring of material such as plastic or cardboard tubing and lies in a generally horizontal position when mounted in the regenerator, on a driving mechanism which comprises a series of support spokes radiating from a central driving hub.

In another embodiment of the invention the lower side of the regenerator matrix is provided with radial grooves extending from the hub of the matrix, the grooves being positioned and dimensioned to receive the driving spokes.

In another embodiment of the invention the grooves in the matrix are formed with a heated tool, so that a substantially continuous fused layer is formed on the surface of the groove to maintain the radial dimensions of the matrix and to provide the matrix with sufficient rigidity for handling during manufacture, assembly, and use.

In another embodiment of the invention the periphery of the wheel is provided with a strip of material having a pile or pile-like surface which acts as a partial seal to restrict air flow through the gap between the periphery of the wheel and a surrounding housing, serves as a regenerator matrix for any air that passes through the pile, and accomodates for any lack of concentricity between the wheel and the housing.

To reduce the cost of the assembly, the components are arranged so that a single driving motor operates both blowers and also rotates the matrix wheel.

BRIEF DESCRIPTION OF THE FIGURES OF THE DRAWING

FIG. 7 is a top plan view of the matrix support.

FIG. 8 is a view in side elevation of the matrix support.

DESCRIPTION OF THE ILLUSTRATED EMBODIMENT

Figure 1:
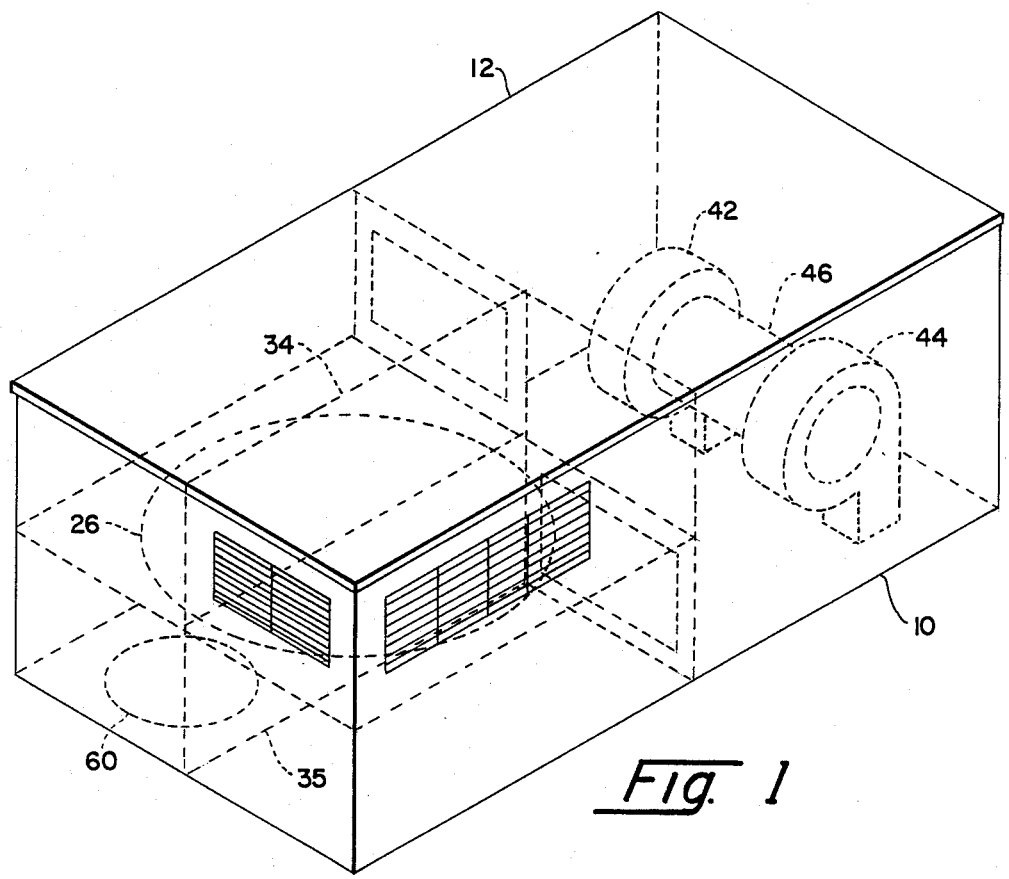
FIG. 1 is a perspective view of the exterior of the housing of a rotary heat regenerator embodying the features of the invention.

Referring to the drawing, there is illustrated a rotary heat exchanger which is adapted for residential use, and comprises an enclosure 10 having a removable top cover 12, and suitable apertures for air flow into and out of the cabinet, as will appear hereinafter.

Disposed within the cabinet is a regenerator matrix support 14 which comprises a hub 16 with a series of arms 18 extending radially therefrom. The hub 16 has a central aperture 20 allowing the hub to be mounted onto a vertical drive shaft 22, which shaft may be rotated by any suitable means such as by a belt driven pulley 24.

Figure 12:
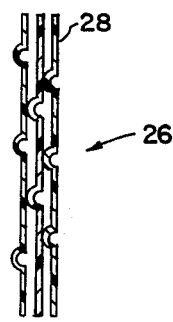
FIG. 12 is a view in section taken on line 12—12 of FIG. 9.

The regenerator matrix 26, in a preferred embodiment, is formed of two continuous spiral wound layers of strips formed of plastic of a type which is capable of being heat sealed, such as polystyrene. A first strip 28 has suitable surface projections to provide gas passages between the strip layers, and a second strip 29 is flat, without projections. (See FIG. 12). Many types of embossments or deformations of strips in spiral wound matrices for such heat exchangers are known in the art. However, it is preferred that the strips and the gas passages formed between the strips have dimensions such that the parameter $L^2/K_s S\, t$ is greater than about 7 hr.ft.deg.F/BTU, where L is the width of the strip (i.e., the thickness of the matrix), $K_s$ is the heat conductivity of the material of which the strip is made, S is the spacing between the strips, and t is the thickness of the strip.

A rotary regenerator matrix having dimensions according to the above formula is disclosed and claimed in a co-pending U.S. application Ser. No. 320,305 filed Nov. 12, 1981, abandoned in favor of Continuation application Ser. No. 714,685 filed Mar. 21, 1985.

In a preferred embodiment of the invention, the strip 28 is wound around a hub 30 formed of plastic or cardboard, the hub having an internal diameter which is substantially equal to the outside diameter of the support hub 16 so that the matrix may be easily assembled onto and removed from the support hub.

A spiral wound matrix wheel cannot be wound tightly, since excessive tension during winding will reduce the size of the gas passages and reduce the efficiency of the matrix. For this reason the matrix wheel 20 has little strength, particularly in a direction perpendicular to the plane of the matrix face.

Therefore the radial arms 18 of the support 14 are provided to underlie the assembled matrix to provide support thereto, and preferably have a length at least great enough to reach the outer periphery of the matrix.

In a preferred embodiment of the matrix, to allow the arms 18 to impart rotation to the matrix and to provide stability to its shape, the underside thereof has a series of radial grooves 32 which are dimensioned and positioned to allow the radial arms 18 to seat therein flush with the lower surface of the matrix when the matrix is placed onto the support hub.

The radial grooves may be made in any convenient manner, but preferably are made in the manner disclosed and claimed in co-pending application Ser. No. 317,756 filed Nov. 3, 1981, now U.S. Pat. No. 4,432,409 issued on Feb. 21, 1984. As disclosed therein, a regenerator matrix may be made from a spiral wound strip of thermoplastic, and may be re-informed by forming radial fused portion by the application of a heated tool of suitable shape to the side surface of the matrix. The heated tool not only forms a groove having a cross-sectional shape corresponding to the cross-sectional shape of the tool, but also causes adjacent layers of the strip to become fused together. This results in (1) a substantially continuous layer of fused plastic being formed in the groove surface, thereby providing rigidity to the matrix to facilitate handling, and (2) the circumference of the matrix being maintained in a circular configuration. However it is also possible to form the grooves by a milling operation.

To control the air flow through the matrix, a seal assembly is provided on each face of the matrix. In the illustrated embodiment the seal assemblies comprise upper and lower plates 34 and 35 which extend between the wheel and the upper and lower surfaces of the housing 10 and generally bisect the face of the matrix. They also extend laterally between the housing walls so that each half of the matrix is in a separate chamber through which incoming and outgoing air can flow independently of each other.

Elongated flexible seals 36 are fastened to the edge of the seal plates 34 and 35 on each side of the center of the matrix wheel and on opposite sides of the plate so that the flexible seals 36 drag against the surface of the wheel as the wheel rotates.

In a preferred embodiment of the invention, the matrix wheel 26 is disposed within an aperture 37 of a seal plate 38, and the matrix wheel is provided with a strip of pile or brush-like material 39 on the periphery. The matrix wheel and the aperture 37 are so dimensioned that the ends of the pile brush lightly against the adjacent wall surface of the seal plate aperture.

Although the pile does not completely seal the space between the matrix periphery and the surrounding wall of the seal plate, it greatly reduces the air leakage through this space, and the pile itself acts as a heat recovery matrix for air leaking through the pile, since it rotates with the matrix wheel through both air streams alternately.

The pile also allows a greater tolerance in the fit of the matrix in the aperture 37 and compensates for lack of concentricity in the matrix. Since the pile is attached to the matrix, it may be cleaned when the matrix is removed for cleaning.

Although the pile may cause some wear on the wall forming the aperture 37, such wear will be to only a limited depth, until the pile barely touches the wall surface, after which time no further wear will occur, and the pile will thereafter still perform its sealing and heat recovery function.

In some instances it may be desirable to place the pile strip on the surface of the wall of the aperture 37, in which position it will serve as a partial seal and will accomodate a lack of concentricity of the matrix. If desired, a strip of pile may be placed on both the wall of the aperture and on the matrix, with said two strips being either in the same plane or overlapping.

For use as a residential heat recovery ventilator it is desirable that the matrix wheel be easily removable for cleaning or for replacement. For this purpose at least the upper seal plate 34 may be mounted in tracks 40 to enable it to be lifted off of the top of the matrix after the cover 12 is removed. The matrix wheel may be lifted off of the support 14, or the support may be lifted off of the shaft 22 to transport the matrix to another location for cleaning or disposal.

The fact that the matrix wheel is mounted for rotation in a horizontal plane enables it to be securely supported by the arms 18 and eliminates the need for other retaining means covering the top of the wheel. If desired a small retaining plate 64 may be assembled onto the upper end of the shaft 22, which is large enough to lap over the hub 30 of the matrix.

Regenerators of the type described herein are used to ventilate a living space without substantial loss of heat, by forcing inside air through one half of the rotating matrix, which absorbs heat from the air, which is then exhausted to the outside, and by drawing in outside air, which is forced through the other half of the rotating wheel, where it picks up heat from the matrix and is discharged into the living space. When the living space is air-controlled, the device allows the living space to be ventilated without substantial increase of the load on the air-conditioning system.

To provide the two airstreams, two blowers are required, and means must also be provided for rotating the matrix wheel. In the illustrated embodiment this is accomplished in an economical manner by providing two blowers 42, 44 and a motor 46, all either mounted on a common shaft or on co-axial shafts connected together. The shaft 48 is also provided with a drive pulley 50 which, through suitable speed reducing pulleys 52 and 54 drives the pulley 24 on the matrix wheel shaft 22. Thus all components of the device are driven by a single motor.

Figure 2:
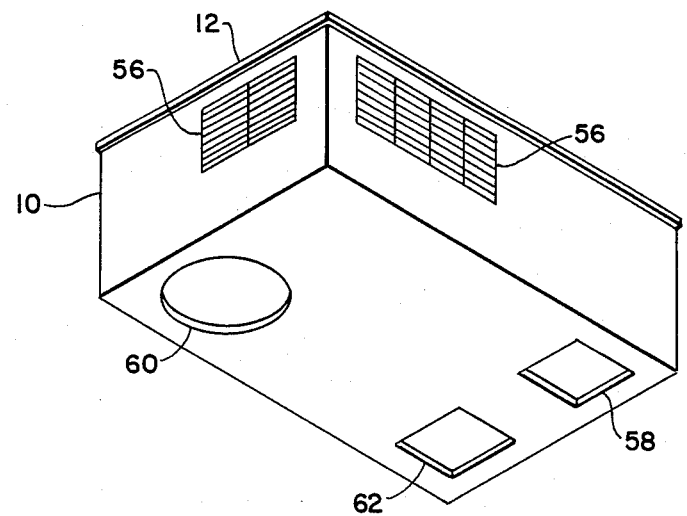
FIG. 2 is a perspective view of the device of FIG. 1 showing the lower surface thereof.
Figure 3:
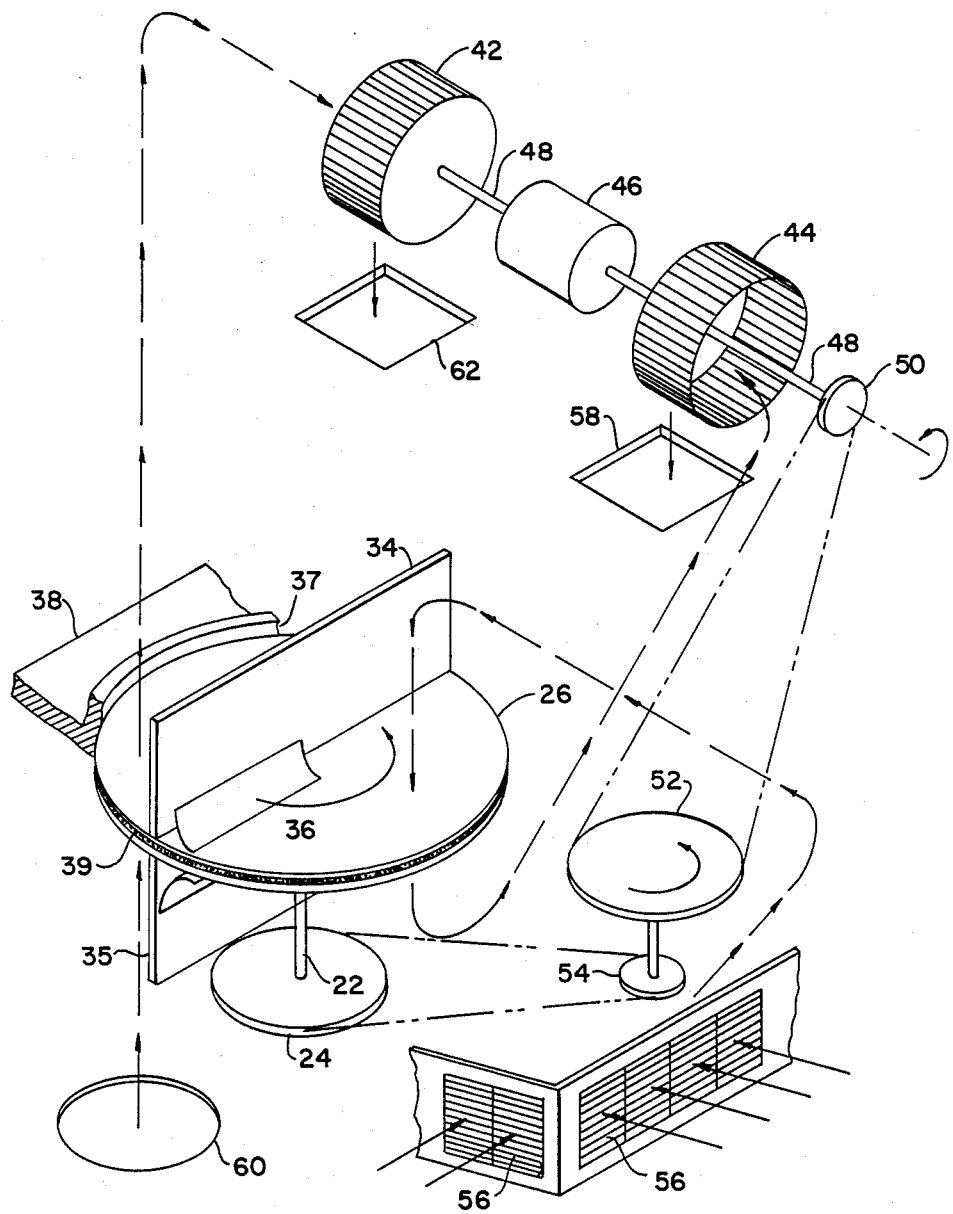
FIG. 3 is a schematic view of some of the interior components of the regenerator illustrating the air flow through the components.
Figure 4:
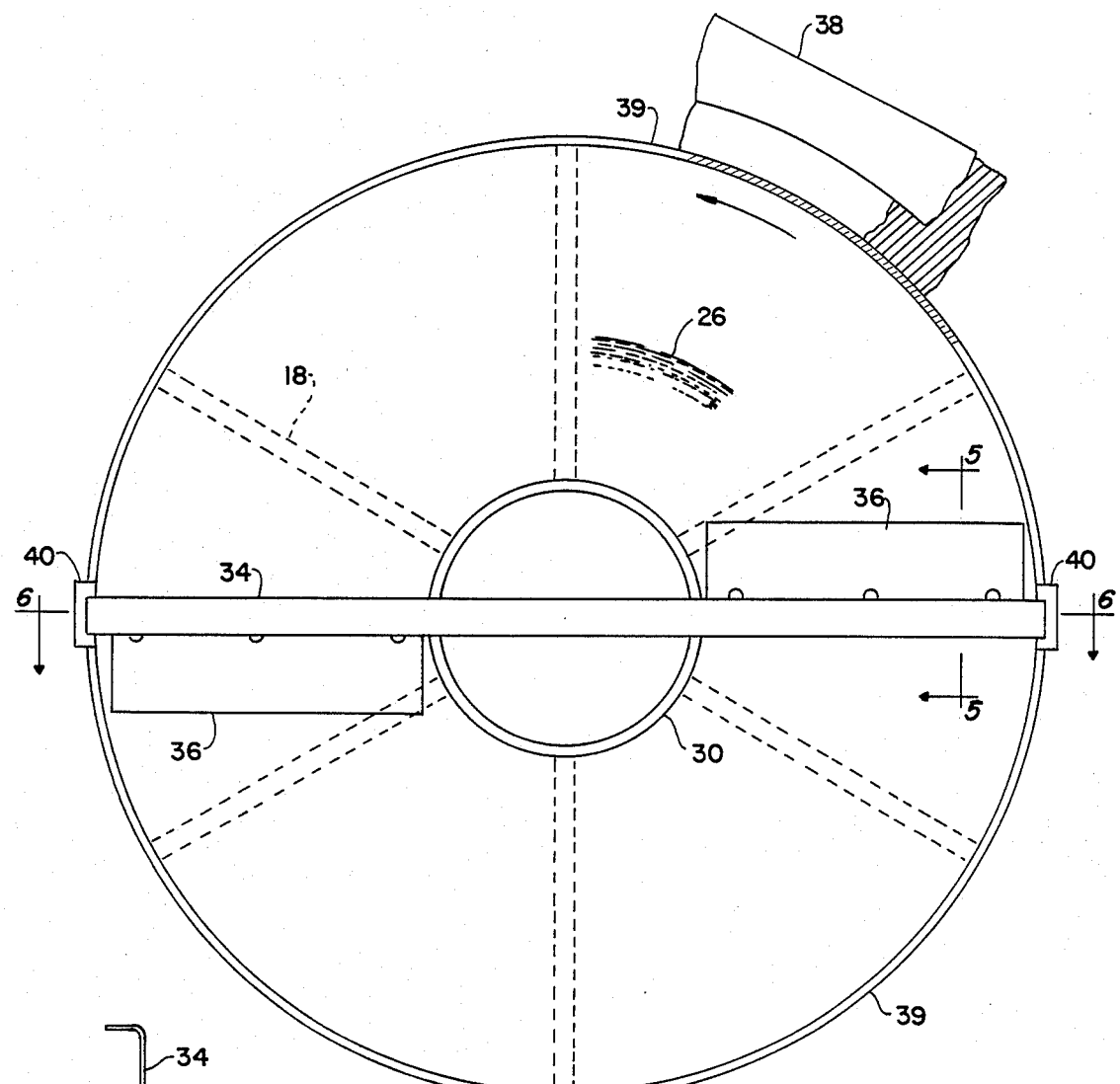
FIG. 4 is a top plan view of the regenerator matrix wheel, matrix wheel support, and matrix wheel seal assembly.
Figure 5:
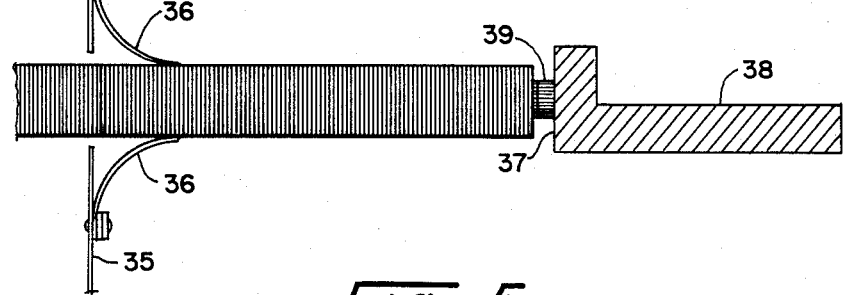
FIG. 5 is a view taken on line 5—5 of FIG. 4.
Figure 6:
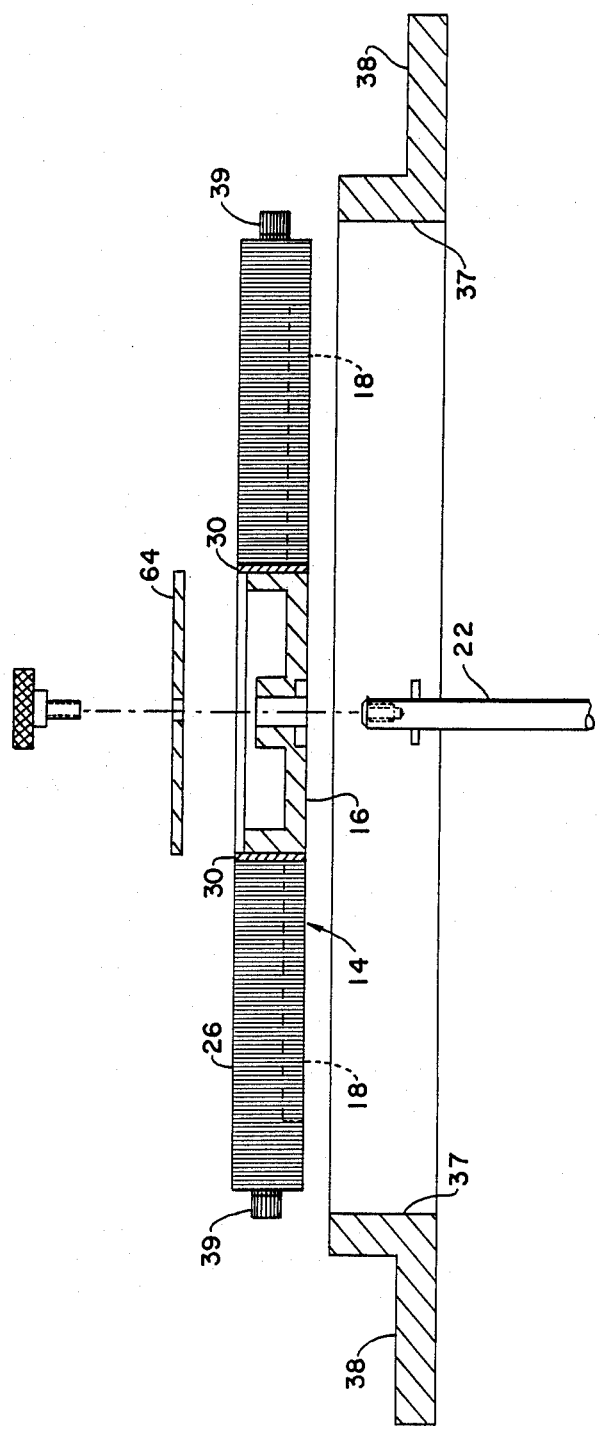
FIG. 6 is a view in section taken on line 6—6 of FIG. 4.
Figure 9:
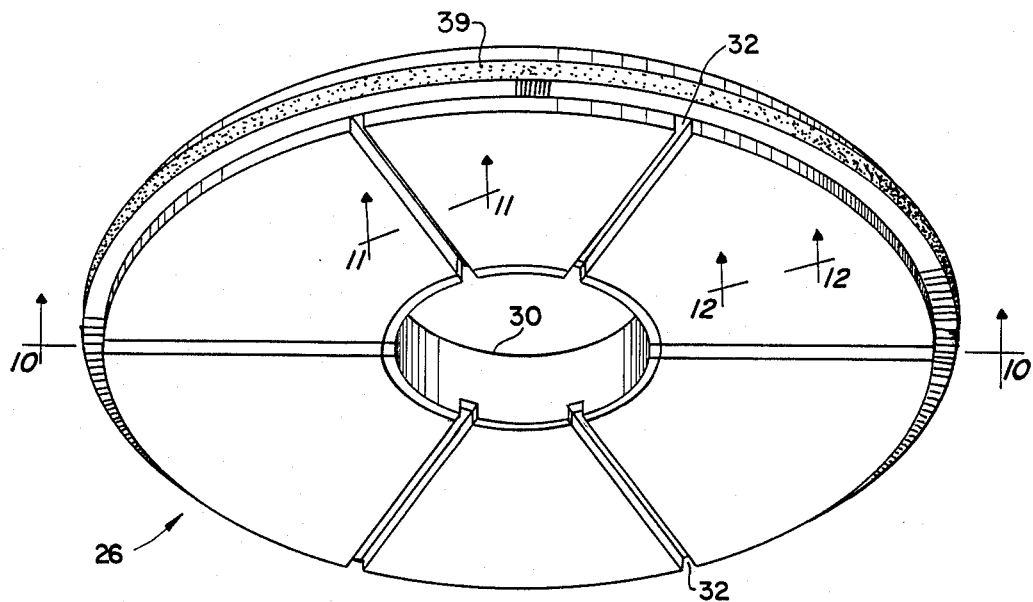
FIG. 9 is a perspective view of the matrix wheel showing the lower side thereof.
Figure 10:
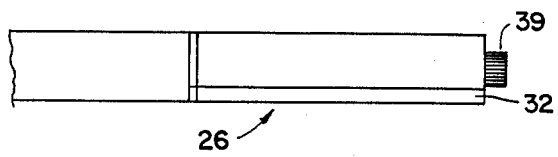
FIG. 10 is a view in section taken on line 10—10 of FIG. 9.
Figure 11:
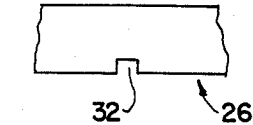
FIG. 11 is a view in section taken on line 11—11 of FIG. 9.

The operation of the device may be described by reference to FIGS. 1, 2, and 3. The particular device illustrated may be utilized to ventilate a mobile home and may be mounted on the floor in a suitable cabinet, over holes in the floor positioned to be aligned with holes in the bottom of the enclosure 10, as will be described.

Air from inside the mobile home is drawn by the blower 44 into the enclosure 10 through louvers 56 down through the adjacent half of the matrix wheel 26, into the blower 44 and out of the enclosure through bottom aperture 58, from where it may be exhausted by suitable ductwork (not shown) to the outdoors.

Simultaneously outside air may be drawn by blower 42 from the outdoors through suitable ductwork (not shown) into the enclosure through aperture 60 in the bottom of the enclosure up through the other half of the matrix wheel (picking up heat left in the matrix by the outgoing air) into the blower 42 and then out of the enclosure 10 through aperture 62 into suitable ductwork (not shown) to be discharged into the interior of the mobile home at a location spaced from the intake louvers 56.

During the period of the year when the interior space is air-conditioned, the air flow is the same, however the incoming air would leave the heat of the outdoor air in the matrix, which would then be removed by the outgoing air.

Although the illustrated unit is intended for mounting on the floor of a mobile home, in some installations it must be mounted on the ceiling in an inverted position. To allow the arms 18 to properly support the matrix in such case, the hub 16 and the drive shaft 22 are so constructed that the wheel may be inverted in relation to the unit, so that the wheel may be mounted on the downwardly extending shaft with the arms 18 on the under side of the matrix.

Although the illustrated embodiment is particularly adapted for use in a mobile or manufactured home, it will be understood that a unit embodying the features of the invention may be used as a window or wall unit in any type of residence or other structure.

Since certain other changes apparent to one skilled in the art may be made in the herein described embodiments of the invention without departing from the scope thereof, it is intended that all matter contained herein be interpreted in an illustrative and not a limiting sense.

What is claimed:

1. In a rotary heat regenerator including a rotatable regenerator matrix formed of a spiral wound strip, the improvement comprising a drive shaft mounted for rotation about a first axis, a matrix support for releasably supporting said matrix, said matrix support being disposed on the drive shaft for rotation about said axis and having a plurality of support arms, said arms being secured to and radially extending from said shaft and being angularly displaced from one another around said axis so as to rotate in a plane when said drive shaft rotates about said axis, said matrix including a like plurality of radial grooves formed in the lower surface thereof, wherein the grooves and the arms are dimensioned so that (1) said arms are respectively seated in said grooves, (2) the lower edges of the arms are substantially flush with the lower surface of the matrix when said arms support said matrix and (3) said grooves can easily be easily removed from said arms.

2. A rotary heat regenerator as set out in claim 1 in which the grooves in the matrix surface are formed by milling.

3. A rotary heat regenerator as set out in claim 1 in which the strip is formed of thermoplastic material and the grooves have surfaces formed by fused edges of the strip.

4. A rotary heat regenerator matrix and matrix support assembly, the matrix comprising at least one strip of material wound about a central hub so as to form a matrix wheel having passages for allowing gas to flow through said matrix, one face of the wheel having a series of radially-extending grooves formed therein, said support assembly comprising a drive hub having an opening for receiving and securing said drive hub to a drive shaft and for supporting said central hub, said assembly including a series of support arms extending radially from and angularly disposed around the drive hub, said arms being shaped and dimensioned so as to (1) seat in the radial grooves of the matrix wheel so that the outer edges of the arms are substantially flush with the face of said wheel, (2) support and rotatably drive said matrix about the rotation axis of the drive shaft, and (3) be easily and repeatably seated in and removed from said grooves so that said matrix can be easily replaced.

5. An assembly as set out in claim 4 in which said strip is formed of thermoplastic material and said grooves have a surface in which the edges of the thermoplastic strip are fused together.

6. A rotary heat regenerator assembly comprising: an enclosure;
a regenerator matrix formed of a spiral wound strip disposed in said enclosure, said matrix including radial groove means formed on one surface of said matrix;
a rotatable shaft disposed in said enclosure and mounted to rotated about the axis of said shaft;
matrix support means for releasably supporting said regenerator matrix, said matrix support means comprising a plurality of support arms, said arms being secured to and extending radially from said rotatable shaft and being angularly displaced from one another around said axis so as to (a) rotate in a rotation plane when said rotatable shaft rotates about said axis, and (b) engage said radial groove means of said regenerator matrix so that said matrix is supported by said arms and permit said regnerative matrix to be (i) readily positionable on and removable from said matrix support, (ii) rotatably driven about said axis by said matrix support and (iii) prevented from moving in a direction against said arms along said axis;
means for defining a first air passageway, wherein a first portion of said matrix is disposed in said first air passageway;
a first blower, associated with said first air passageway, for forcing air through said first air passageway and said first matrix portion;
means for defining a second air passageway, wherein a second portion of said matrix different from said first portion is disposed in said second air passageway;
a second blower, associated with said second air passageway, for forcing air through said second air passageway and said second matrix portion;
a blower driver motor for driving said first and second blowers; and
speed reduction driving means for coupling said motor to said rotatable shaft so that said motor rotatably drives said matrix about said axis.

7. A regenerator assembly according to claim 6, wherein said groove means receive said arms so that the lower edges of said arms are substantially flush with said one surface of said regenerator matrix.

8. A regenerator assembly according to claim 6, wherein the rotation plane of said support arms is substantially horizontal.

9. A regenerator assembly according to claim 6, further comprising partition means contacting said one surface of said regenerator matrix and an opposite surface of said regenerator matrix, for defining a barrier between said first air passage and said second air passage, said partition means comprising an opening, an upper seal plate for substantially pneumatically sealing said opening, and means for slidably mounting said upper seal plate in said opening so that said upper seal plate can be removed to provide access to said regenerator matrix so as to allow said matrix to be positioned on and removed from said matrix support.

10. A regenerator assembly according to claim 9, further wherein said partition means comprises seal means for contacting the one and other surfaces of said regenerator matrix so as to (1) substantially prevent air from passing between said first and second air passages adjacent said one and other surfaces while (2) allowing said regenerator matrix to rotate relative to said partition means.

11. A regenerator assembly according to claim 6, further including a common shaft for rotatably supporting said first and second blowers, wherein said blower driver motor is disposed between said first and second blowers and said blower drive motor is mounted to said common drive shaft so as to transmit rotational drive thereto.

12. A regenerator assembly according to claim 11, wherein said driver motor drives said rotatable shaft through said speed reducing means so that said rotatable shaft rotates more slowly that said common shaft.

* * * * *

UNITED STATES PATENT AND TRADEMARK OFFICE
CERTIFICATE OF CORRECTION

PATENT NO. : 4,825,936

DATED : May 2, 1989

INVENTOR(S) : Lawrence C. Hoagland and Donald F. Steele

It is certified that error appears in the above-identified patent and that said Letters Patent is hereby corrected as shown below:

Claim 1, column 5, line 61, after "easily" (first occurrence) insert -- and repeatably be seated on said arms so that said matrix can --;

Claim 6, column 6, line 30, delete "rotated" and substitute therefor -- rotate --;

Claim 12, column 8, line 17, delete "that" and substitute therefor -- than --.

Signed and Sealed this

Sixth Day of February, 1990

Attest:

JEFFREY M. SAMUELS

*Attesting Officer*    *Acting Commissioner of Patents and Trademarks*